Sept. 15, 1970     M. M. MILLER     3,528,559
DISPLAY DEVICE
Filed Dec. 4, 1967     2 Sheets-Sheet 1
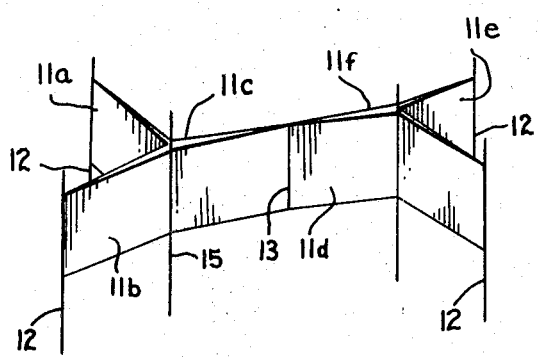
Fig. 1
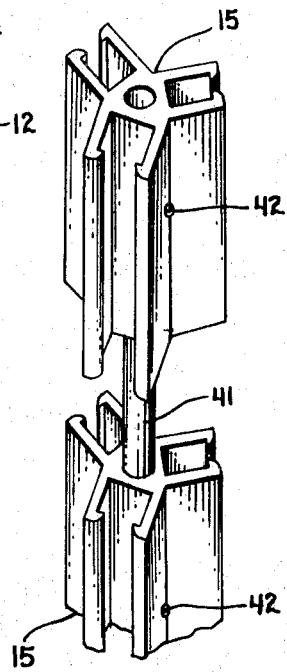
Fig. 7
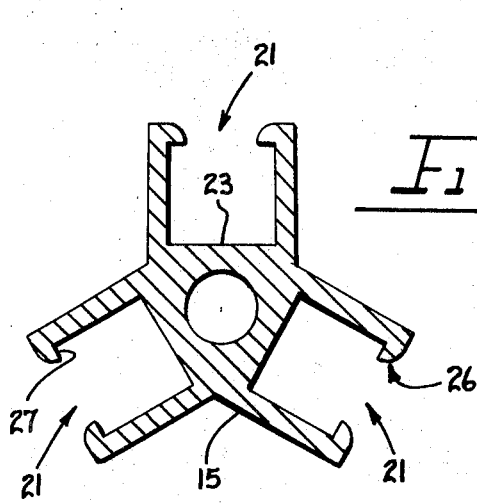
Fig. 3
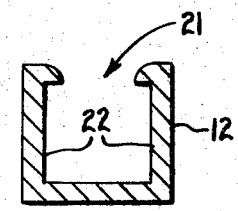
Fig. 2
Fig. 4
INVENTOR.
MELVIN M. MILLER
BY
Woodard, Weikart, Emhardt & Naughton
ATTORNEYS

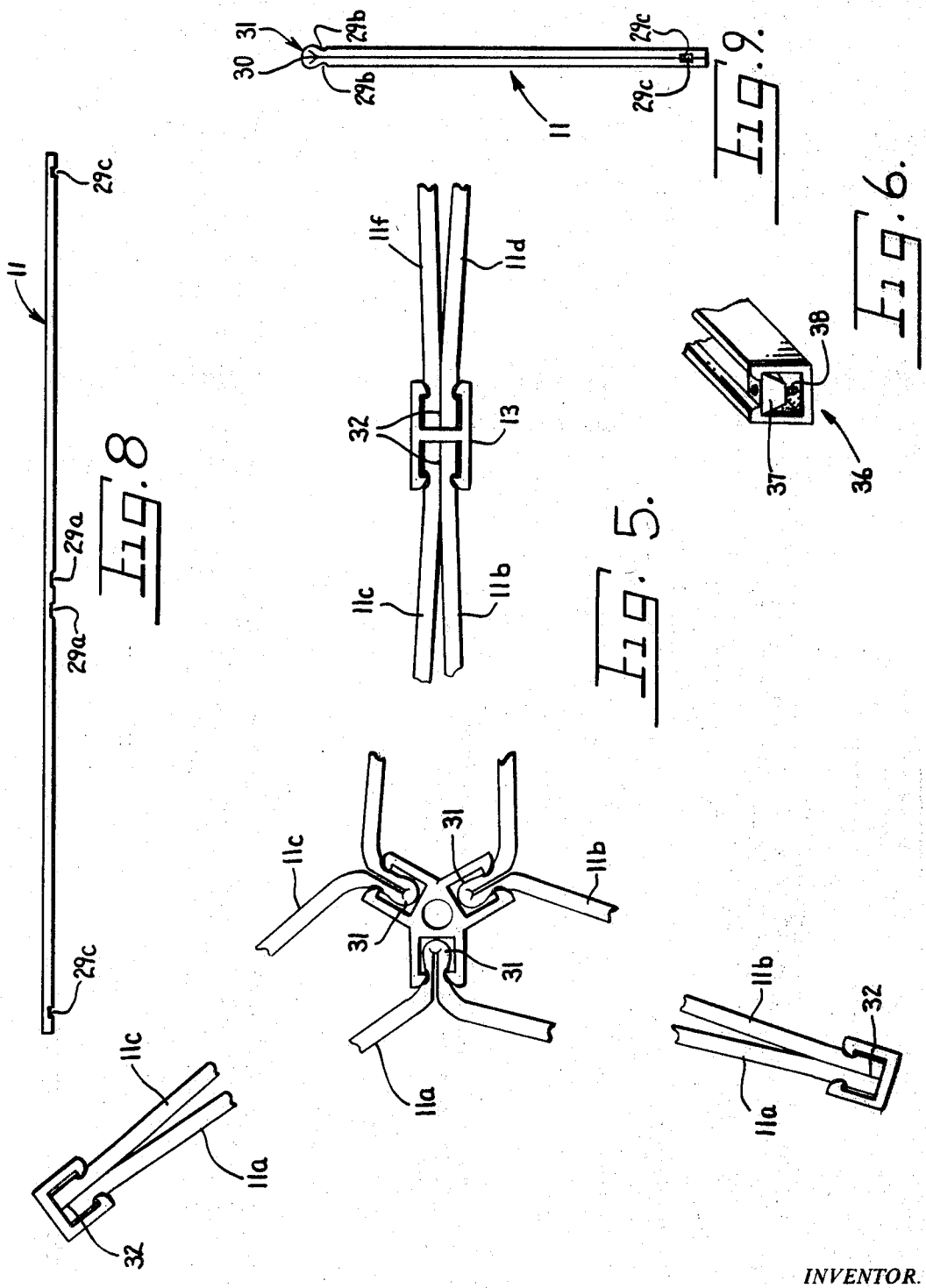

3,528,559
DISPLAY DEVICE
Melvin M. Miller, 3302 Stoney Crest Road,
Bloomington, Ind. 47401
Filed Dec. 4, 1967, Ser. No. 687,627
Int. Cl. A47f 5/10
U.S. Cl. 211—178                              1 Claim

ABSTRACT OF THE DISCLOSURE

A plurality of resilient foldable panels supported by channel members to provide a free-standing labyrinth-like display.

BACKGROUND OF THE INVENTION

Field of the invention

The field of the invention is generally supports and racks, and more particularly, knockdown, foldable or collapsible display supports.

Description of the prior art

Several labyrinth-type display devices are known in the art. Representative of these are the devices disclosed in Nordstrom 3,319,801 and Plastow 3,314,551. The Nordstrom device comprises a plurality of rigid panels connected together by hinge means, brace plates, bolts and wing nuts. It appears to be somewhat limited in its configuration. The Plastow device, on the other hand, is considerably more versatile, having a plurality of channel members and flexible web means for coupling them together.

With the increased costs of labor and transportation, it has become steadily more expensive for manufacturers and distributors to provide eye-appealing displays at conventions, industrial shows and the like. The same is true with all persons who use similar display devices.

What is needed is a more versatile display device which may be adapted to a large variety of configurations so that it will fit in with the available space in auditoriums, hotel rooms, and other convention facilities. At the same time, the device should have a minimum of basic components, be light in weight so that one person can assemble it and transport it and be easily assembled and disassembled in a short amount of time. It should be self-supporting or free-standing, and should provide panels with display surfaces which may be painted, will accept glue or other adhesive and accept thumbtacks. The display device of the present invention provides all of these features, and does so at a cost lower than any of the other devices known to the inventor.

SUMMARY OF THE INVENTION

A display device using resilient, foldable panels and channel members which couple the panels together and provide legs for the display device. The use of resilient, foldable panels eliminates the need for hinges or other flexible means, such as the webs used in the device disclosed in Plastow. The channel members are formed in three basic shapes—single channel, double channel and triple channel—which provide for assembling the display device in a very large variety of configurations.

It is therefore an object of the present invention to provide an improved display device.

It is also an object of the present invention to provide a versatile free-standing display device having a minimum of basic components.

It is another object of the present invention to provide a display device which may be adapted to a large variety of configurations so that it will fit into the available space where displays are desired.

It is still another object of the present invention to provide a display device with resilient foldable panels which will accept paint, adhesives and thumbtacks.

It is yet another object of the present invention to provide a display device that is light in weight, easily transported, easily assembled and disassembled in a short amount of time, and economical.

These and other objects and advantages of the display device of the present invention will become apparent as the description of the preferred embodiments proceeds, reference being had to the attached drawings and appended claim.

BRIEF DESCRIPTION OF THE DRAWINGS

FIG. 1 is a somewhat diagrammatic perspective view of one of the possible configurations of the display device of the present invention.

FIG. 2 is a cross sectional view of one of the types of channel members of the present invention.

FIG. 3 is a cross sectional view of another of the types of channel members of the present invention.

FIG. 4 is a cross sectional view of still another of the types of channel members of the present invention.

FIG. 5 is a segmented plan view of a portion of the configuration illustrated in FIG. 1.

FIG. 6 is a perspective view of a channel member of the type illustrated in FIG. 2 showing a stop in place therein.

FIG. 7 is a partial exploded perspective view of two channel members of the type shown in FIG. 3 showing a dowel and set screws used to couple the two channel members together end to end.

FIG. 8 is a top view of one of the panels of the display device of the present invention showing the first step in preparing the panel for use.

FIG. 9 is a top view of one of the panels of the display device showing subsequent steps in preparing the panel for use.

DESCRIPTION OF THE PREFERRED EMBODIMENTS

Referring now to FIG. 1, there is shown a somewhat diagrammatic perspective view of one of the many possible configurations of the display device of the present invention. This particular configuration has six panels 11, indicated individually as 11a, 11b, 11c, 11d, 11e and 11f. Each of the panels 11 is folded and scored as will be described in detail subsequently.

The panels 11 are supported by channel members 12, 13 and 15. The channel members 12, as best shown in FIG. 2, have a single channel 21 that is received on prescored lateral margins of the panels 11. Each channel member 13, as best shown in FIG. 4 has two channels 21, back to back. The channel members 15, as best shown in FIG. 3, have three channels 21 equally spaced 120 degrees apart.

The channels 21 defined by the channel members 12, 13 and 15 have substantially parallel sidewalls 22 and a rear wall 23 joining the sidewalls substantially perpendicularly. Each sidewall is provided with a right-angled inwardly-directed lip 26. Each lip 26 has an inner surface 27 that is substantially perpendicular to the sidewalls 22 and an outer surface 28 that is generally rounded.

The panels 11 are formed of resilient, foldable material, such as foamed plastic, having a surface suitable for receiving paint, adhesive or thumbtacks. The panels 11 are prepared for use in the display device of the present invention by scoring and folding, as best shown in FIGS. 5 and 8. FIG. 5 shows a portion of the configuration illustrated in FIG. 1.

The panels 11 are first scored on either side of center to form scores 29a and 29c, as best shown in FIG. 8.

The panels 11 are then folded to bring the scores 29a and 29c toward each other as shown in FIG. 9. In this configuration, the panels 11 are scored to form scores 29b. It will be noted that the portion between the scores 29a puckers to form a bead 30. All of the scores are substantially identical, the scores 29a acting to form the bead 30, and the scores 29b and 29c acting to provide clearance for the lips 26 of the channels 21 as will be subsequently described.

Folded double thickness margins 31, as shown in FIGS. 5 and 9 may be "snapped" into the channels 21. Once a margin 31 is inserted within a channel 21, the panel is opened as shown in FIG. 5 to spread the scores 29b, creating a bite on them by the channel lips 26 to frictionally and resiliently hold or grip the panel 11.

Double thickness margins 32 are formed by a single thickness of each of two panels 11, and because they are "squared off" cannot be "snapped" into a channel 21 as can the margins 31. Instead, channel members 12 or 13 may be slid onto the margins 31 longitudinally with the lips 26 frictionally and resiliently gripping the scores 29c.

To assemble the configuration shown in FIG. 1, the user would first snap the double thickness folded margins 31 of two of the panels, say panels 11a and 11b, into two of the channels 21 of a channel member 15. The two adjacent margins of the panels 11a and 11b are then brought together to form a double thickness margin 32 and a channel member 12 slid longitudinally thereon to hold them together. The margin 31 of panel 31c may then be snapped into the remaining channel 21 of the channel member 15, and each of its lateral margins paired with the remaining lateral margin of panels 11a and 11b to form additional double thickness margins 32, over which may be slid a single channel member 12 or a double channel member 13. Wherever a double channel member 13 is used, the configuration may be further extended to include more panels and channel members.

It will be seen that the panels 11 and channel members 12, 13 and 15 may be combined to form a labyrinth-type display which may take on a very large variety of configurations. Such a display, because of its angular configuration, is free-standing and has good stability.

As the panels 11 become slightly worn, it has been found that they may not fit as snugly into the channels 21. When this happens, it may be necessary to provide means for preventing the panels 11 from slipping downwardly within the channels 21. A small stop 36, as shown in FIG. 6 has been found to be very satisfactory in this application. The stop 36 has a body portion 37 sized to fit within the channel 21, and has a set screw 38 which may be advanced so that its end engages the rear wall 23 and forces the body portion 37 against the inner surfaces 27 of the lips 26. Placement of stops 36 at the desired position of the lower margins of the panels 11 holds the panels 11 from slipping downwardly.

It may be desirable to provide the channel members 12 and 15 in lengths convenient for transportation. For example, each channel member 12 and 15 as shown in FIG. 1 may be formed of parts each having a length the same as that of the channel member 13. No connective means other than the panels themselves are required to hold two parts of a channel 12 together, however, it has been found convenient to provide two parts of a channel member 15 with coupling means to facilitate erection of the display device.

The coupling means for channel members 15 may include a dowel 41, as shown in FIG. 7, received in centrally located longitudinal cylindrical holes through the channel member 15 concentric with the equilateral triangle formed by the rear walls 23 of the three channels 21. Set screws 43 threadedly mounted in the channel member 15 may be adapted to engage the dowel 41.

It will be seen that the present invention provides an improved display device, having a minimum of basic components and providing a very large variety of possible configurations. It is modular in form, and may be added to, or used in part.

The panels 11 provide vertical display surfaces which will accept paint, adhesives or thumbtacks, and are comparatively light in weight, for ease of transportation and handling.

One particularly advantageous feature of the display device of the present invention is the protection accorded to the display surfaces during storage and transportation of the display device. This is because in storage or transportation, the panels 11 are folded so that the display surfaces are face-to-face, as shown in FIG. 9, with the opposite surfaces exposed. Any damage, therefore, is sustained by the opposite surfaces, which it should be noted, are concealed when the display is assembled.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention and the scope of the claim are also desired to be protected. For example, the display device of the present invention may be suspended from above or affixed to a wall rather than being set on the floor, in which case the channel members need not extend below the bottom margins of the panels 11 to provide legs for the display device.

The invention claimed is:

1. In a display device, a plurality of resilient foldable panels having upper, lower and lateral margins, and a plurality of elongated channel members defining channels to be received upon lateral margins of the panels, wherein each of the plurality of panels has first scores in closely spaced apart relationship on one surface, second scores parallel to the first scores, each of the second scores spaced outwardly from the first scores and on the opposite surface of the panel, and third scores parallel to the first and second scores, each of the third scores being on the one surface and adjacent to a lateral margin of the panel.

References Cited

UNITED STATES PATENTS

| | | |
|---|---|---|
| 2,854,103 | 9/1958 | Kruger. |
| 2,886,481 | 5/1959 | Swan _____ 160—391 X |
| 2,934,214 | 4/1960 | Mogulescu et al. ___ 211—184 X |
| 3,216,538 | 11/1965 | Miller. |

FOREIGN PATENTS 937,197   12/1955   Germany.

DAVID J. WILLIAMOWSKY, Primary Examiner

W. L. SHEDD, Assistant Examiner

U.S. Cl. X.R.

211—180, 182, 184; 52—285, 495